(12) United States Patent
Jones

(10) Patent No.: US 6,405,663 B1
(45) Date of Patent: Jun. 18, 2002

(54) METHOD AND APPARATUS FOR WASTE TREATMENT

(75) Inventor: Ian Jones, Thornlands (AU)

(73) Assignee: Plas, Ltd., Tortola (VG)

( * ) Notice: Subject to any disclaimer, the term of this patent is extended or adjusted under 35 U.S.C. 154(b) by 0 days.

(21) Appl. No.: 09/068,470

(22) PCT Filed: Nov. 8, 1996

(86) PCT No.: PCT/AU96/00716

§ 371 (c)(1),
(2), (4) Date: Jun. 10, 1999

(87) PCT Pub. No.: WO97/17573

PCT Pub. Date: May 15, 1997

(30) Foreign Application Priority Data

Aug. 11, 1995 (AU) .................................................. 6448

(51) Int. Cl.⁷ .................................................. F23B 7/00
(52) U.S. Cl. ........................ 110/342; 110/246; 110/223; 110/226
(58) Field of Search ............................ 110/347, 165 A, 110/246, 221, 223, 224, 226, 346, 342; 432/14, 103

(56) References Cited

U.S. PATENT DOCUMENTS

| | | | |
|---|---|---|---|
| 4,284,015 A | * 8/1981 | Dickinson ................... | 110/347 |
| 4,533,532 A | * 8/1985 | Gebhard et al. ............. | 423/244 |
| 4,957,048 A | * 9/1990 | Beer et al. .................. | 110/235 |
| 5,100,633 A | * 3/1992 | Morrison ..................... | 423/225 |
| 5,569,436 A | * 10/1996 | Lerner ......................... | 422/170 |
| 5,645,616 A | * 7/1997 | McIlroy et al. ............... | 48/202 |
| 5,695,726 A | * 12/1997 | Lerner ......................... | 423/210 |
| 6,109,913 A | * 9/2000 | Young ......................... | 432/16 |

* cited by examiner

Primary Examiner—Henry Bennett
Assistant Examiner—K. B. Rinehart
(74) Attorney, Agent, or Firm—Schwegman, Lundberg, Woessner & Kluth, P.A.

(57) ABSTRACT

A method of waste water treatment including mixing waste material with a binder, pelletizing the mixture and kiln incineration of the pellets to ceramify same, with processing of flue gases. In an embodiment, the pH of the mixture is maintained alkaline. In an embodiment, the pelletized mixture is coated with ball clay to 10–20% by weight, and then with china clay, prior to firing. The high temperature flue gases and entrained heavy metal or dust exhausting the kiln are directed through a multistage scrubbing system. In an embodiment, volatiles are adsorbed prior to the gas passing through an alkali wet scrubber to remove chlorine compounds and heavy metals, and sulphur compounds. The sludge from the acid scrubber is neutralized and further treated to remove mercury.

20 Claims, 4 Drawing Sheets

METHOD AND APPARATUS FOR WASTE TREATMENT

FIELD OF THE INVENTION

This invention relates to apparatus methods of waste treatment.

BACKGROUND

This invention has particular but not exclusive application to apparatus and methods for the incinerative processing of waste with organic content such as municipal wastes, and for illustrative purposes reference will be made to such application. However, it is to be understood that this invention could be used in other applications, such as processing of industrial waste.

Waste disposal and particularly the disposal of bulk waste is an ongoing problem, with landfills being rapidly filled and polluting leachates therefrom being a frequent contaminant of waterways. Municipal and industrial wastes invariably contain or break down to form toxic products and polluting outgas. Such waste may include sub-micron particulates to liquids and gases and may contain substances of extreme human or environmental toxicity such as toxic metals, synthetic organic compounds and unnatural concentrations of normally innocuous substances such as hydrocarbons, refuse and sewage.

Highly toxic wastes of the organic type such as poly chlorinated aromatic hydrocarbons such as PCB's are presently disposed of by high temperature incineration. Often, the waste must be transported overseas to be destroyed either at foreign specialized facilities or at sea. Foreign treatment is extremely expensive, a cost which is added to the cost of manufactures at home.

Other less toxic wastes are disposed of by less intensive and more cost effective treatments such as by cementation and burial or dumping of the solid waste product. This method of disposal presents the problem of the disposal of the liquid supernatant of the cementation process as well as the disposal of an increased volume of often leachable solid material. Sewage waste solids are generally even more simply disposed of by settling and evaporation of primary treatment slurries followed by open-site dumping of the partially dewatered sludge.

Where hydrocarbon based waste such as condemned fuel and waste lubricants is to be destroyed, this has generally been by incineration. However, the energy values of such waste are generally wasted since contamination of the waste prevents its use as incinerator fuel.

Wherever incineration of waste is done, there remains a disposal problem in respect of leachable ash and scrubber sludges.

International Patent Specification WO 90/12251 discloses an improved method and apparatus for waste treatment including grinding bulk waste from a broad range of sources, mixing the waste material with a binder, pelletizing the mixture, coating the pellets with a refractory material and firing the mixture in a furnace at a temperature above 1300 degrees celsius. It was found that heating the waste pellets to a temperature above 1300 degrees celsius under oxidizing conditions provided a product clinker having reduced leachability and increased chemical and physical stability, and flue gases having no unpyrolysed content and a high oxidation state compared with prior art incineration processes.

The process disclosed has several disadvantages. One disadvantage is that the coating process essential to prevent agglomeration of the pellets, utilizing as it does aluminium silicate-rich clay dust, tends to result in an easily spalled coating to the pellets under processing and kiln conditions. This results in an unacceptably high agglomeration rate of the pellets in the kiln.

Accordingly it is an object of the present invention to provide an apparatus and method for treating a broad variety of waste, which apparatus and which will alleviate the deficiencies of the prior art and are reliable, economical and efficient in use. Other objects and advantages of this invention will hereinafter become apparent.

SUMMARY

With the foregoing and other objects in view, this invention in one aspect resides broadly in a method of treatment of waste material including the steps of:

mixing the waste material with a firable binder;

pelletizing the mixture;

coating the pellets with a coating comprising a refractory material selected to permit firing of the pellets substantially without pellet agglomeration, and a support material for said refractory, and firing said coated pellets in a rotary kiln.

It has surprisingly been determined that the spalling problems associated with the use of refractory coating of the pellets prior to and during firing are substantially alleviated by the process of the present invention, whether or not the support material comprises a non agglomerating material under kiln and processing conditions.

The waster material may include any solid, liquid or mixed waste product including sewage sludges, oil sludges, common garbage or liquid toxic metal wastes, and including mixtures of waste materials. Preferably the waste material has a solid content and/or solids are added to the mixture before firing such that the mixture of the waste with the binder material is of a consistency suitable for pelletizing.

Preferably, the waste material has a combustible content and/or combustible materials are added to the mixture before firing such that the energy demand of the firing process is diminished. However, in the case of wastes having little or no inherent energy available from high temperature oxidation in air, it is envisaged that the entire energy requirement may be provided by an external source such as electricity, pulverized coal, gas or fuel oil.

The waste materials may be pumped or conveyed to a mixer where they may be blended with absorbent and earthen materials, and, if necessary, further water and other materials to produce a firm plastic type material. By example the composition of a typical processed galvanic sludge and toxic liquid waste prior to pelletising is, by weight:

Waste 46% (galvanic sludge & liquid waste)

Absorbent 9% (sawdust)

Clay 1%

Other 4% (lime and barium carbonate)

Typically the components of the mix prior to pelletizing lie within the band, by weight, of:

| | |
|---|---|
| 15–50% | waste as received |
| 5–12% | absorbent (sawdust, newspaper, etc.) |
| 40–60% | clay |

| | -continued |
|---|---|
| 0–15% | other material (lime, old glass, fluxing agents) |
| 0–15% | water (as required) |

The amount of waste that can be incorporated is dependent on the type of waste and the strength of the final pellet required. Alkali such as lime may be used to control the pH of the mix to a preferred slightly alkaline state as well as to give the desired ceramic characteristics of the finished pellet. Where the mixture is acidic, the lime, lime containing waste stream materials or other alkali or basic materials may be added to at least partially neutralize the mixture during firing to control outgassing, resulting in the production of closed-surfaced fired pellets. Outgassing tends to form voids in the pellets which may reach the surface to form pores. This phenomenon may be desirable where the pellets are to be recycled to the process with, for example, a liquid waste adsorbed into the pellets.

After mixing, the material may be pelletized by any suitable process such as sheet rolling and punching, extrusion, or the like. Preferably, the mixture is extruded through a die consisting of a plurality of holes of typically 10 mm diameter in a die plate, and the resultant extruded material cut off at typically about 15 mm length to form pellets.

After pelletizing, the pellets are coated. Preferably, the refractory coating is selected from the refractory clays such as those having a high aluminium silicate content, china clays, refractory compounds such as aluminium silicate per se, or other suitable refractory, non agglomerating material. By "refractory" in this context is meant those materials having sufficient resistance to melting at all temperatures below 1200° C. and a sufficient range above 1200° C. to enable pellets coated therewith to resist agglomeration under rotary kiln process conditions.

The support material may be selected from material compatible with the refractory materials, such as hydrated silicates, organic binders such as resins, or sticky clays such as ball clays. The support may be applied to the pellets preparatory to coating the pellets with refractory material, or may be co-compounded with the refractory material prior to coating the pellets, to serve as a binder thereafter.

Preferably, a two stage pellet coating process is used wherein sticky ball clay is used to coat the pellet first to act as a contact binder for a china clay refractory material applied thereafter. All excess coatings, as well as spillage, are preferably recycled back to the pellet mix leaving no residues.

The pellets may be tumbled or rolled after coating to produce a smooth surface which, depending on the nature of the materials involved, may provide a smooth surfaced final fired pellet product or a non porous aggregate.

Where the pellets are pre-coated with ball clay, this is typically to a loading of about 10–20% by weight, in a dusting drum to uniformly coat them and round them slightly after which they may be screened to remove excess clay, which may be recycled to the mixing process. Typically, the pellets may be passed through a second dusting stage where they are coated with china clay, preferably to an amount of 5 to 10% by weight, before entering a drier prior to firing in the rotary kiln. The off gases from the predrier are advantageously passed through the kiln where any toxic or hazardous emissions are destroyed.

The rotary kiln may take any form consistent with the function of heating the pellets with tumbling to the desired process temperature. Preferably, the kiln is selected to be operable at temperatures above 1200 Degrees Celsius. Preferably, the kiln takes the form of a rotary downdraft kiln.

The heating of the pellets in the rotary kiln may be controlled by varying the residence time of the pellets in the kiln. For example, residence time may be varied by varying one or more of the length of the kiln, the inclination of the kiln and its rate of rotation.

The rotary kiln treatment as described above is of course an energy-intensive process requiring large amounts of combustible material to be either present in the waste itself or added in the form of furnace fuel oil or pulverized coal. Accordingly, in order to reduce the energy burden of the process, it is preferred to utilize heat recovery from the fired pellets and/or the flue gases of the process. Preferably, part of the recycled heat is used to preheat the coated pellets prior to firing.

The preheating of the pellets prior to firing results in the stripping of some water and combustible volatile components from the pellets. The airflow charged with these combustible components is preferably fed directly to the kiln whereupon the heat of the combustibles are available for immediate application to maintaining the kiln temperature.

Materials with calorific value which can be direct fired in the kiln may be pumped through lances directly into the kiln where they are burnt and are destroyed in the high temperature gases, usually at temperatures above 1200° C.

Once the pellets have been coated they enter the rotary kiln where they are preferably subject to temperatures of 1200° C. or more. The organic distillates and pyrosylates are destroyed in the high temperature gases while any heavy metals or dust not incorporated into the ceramic matrix of the pellets may escape the kiln in the primary flue gas.

The speed with which the pellets pass through the kiln is controlled by the rotational speed of the kiln and this is set to allow the pellets time to properly sinter and form the ceramic inner material in which most of the heavy metals are bound. The coating stops the pellets sticking together or to the walls of the kiln.

The pellets exit the kiln after approximately 20 minutes, are cooled with combustion air and screened to remove fines. The fines are recirculated back to the pellet mixing while the good pellets go to storage awaiting final testing before being sold as inert, light weight aggregate.

The prior art processes including that disclosed in International Patent Specification WO 90/12251 further has the disadvantage of the flue gases and precipitates therefrom not being amenable to direct disposal. Further, the temperature of operation of the kiln required to obtain a satisfactory flue gas outcome requires a large amount of energy to maintain.

Accordingly, in a further aspect, this invention resides in a method of treatment of waste material including the steps of:

mixing the waste material with binder;

pelletizing the mixture;

coating the pellets with a non agglomerating material selected to permit firing without agglomeration;

firing said coated pellets at least 1200° C. in a rotary kiln;

cooling flue gases from said kiln with recovery of heat values;

removing particulates from said cooled flue gas;

sequentially wet acid and alkali scrubbing said cooled flue gas; and recycling scrubber sludges to said mixing step.

The flue gases exhausting the kiln may be cooled and heat values recovered by any suitable means. For example, the flue gases may be cooled by a gas to air heat exchanger wherein heated air may be passed to the kiln. Alternatively, heat may be recovered into a boiler. Typically, boiler outflows are at a temperature of about 400° C., and flue gas directed through a waste heat boiler may be quenched prior to further treatment. If required, entrained particulates passing the boiler stage may be separated prior to further cooling.

Further cooling may be by any suitable means such as water quenching. A small amount of a solid absorbent such as activated carbon may be added to selectively absorb amenable components, and the stream may be filtered to remove condensates and particulates at this stage, for return thereof to the mixing stage.

The gases may be further cooled if required and then passed to an aqueous acid wet scrubber, whereupon halogens, principally chlorine, and heavy metals are removed by dissolution or precipitation, followed by an aqueous wet alkali scrubber similarly dissolving or precipitating amenable compounds such as acid oxides and oxyanionic compounds, principally sulphur oxyacids.

The sludge from the acid scrubber is preferably neutralised whereupon it may be firther treated to remove condensable metals such as mercury, the treated sludge being preferably returned to either the mixing process after dewatering, or to the quench process to maintain acid values.

If not enough chlorine is available in the flue gas to maintain the acid conditions in the acid scrubber a suitable acidifying agent such as hydrochloric acid may be added to the acid scrubber.

The alkali scrubber may be maintained in the alkaline range by addition of a suitable mineral alkali such as an alkali metal or alkaline earth metal hydroxide. The sludge produced by precipitation in this scrubber may advantageously be recycled to the process as waste. If desired, accumulative components such as sulphuric acid salts, in the form of soluble sodium sulphate in a caustic soda scrubber or as insoluble gypsum in a lime scrubber, may be precipitated or removed respectively as gypsum before recycling the sludge to the front end of the process.

The cleaned gas stream may be exhausted through the heat exchanger to a stack to atmosphere.

Other high value elements can also be removed from the sludges, if economic. This has been severely restricted in the past because of the inability to safely treat the resultant contaminated sludges generated in extracting these materials. In the process as described there are no harmful residues that require secure landfill or burial.

In a yet further aspect, this invention resides broadly in waste precessing apparatus including:

rotary kiln means adapted for firing pellets comprising waste material and a binder, coated with a non agglomerating material selected to permit firing without agglomeration at least 1200° C.;

heat exchange means adapted to cool flue gases from said kiln with recovery of heat values;

particulate removing means for said flue gas, and sequential wet acid and alkali flue gas scrubbing means.

BRIEF DESCRIPTION OF THE DRAWINGS

In order that this invention may be more readily understood and put into practical effect, it will be described with reference to the accompanying drawings wherein.

DETAILED DESCRIPTION

Figure 1:
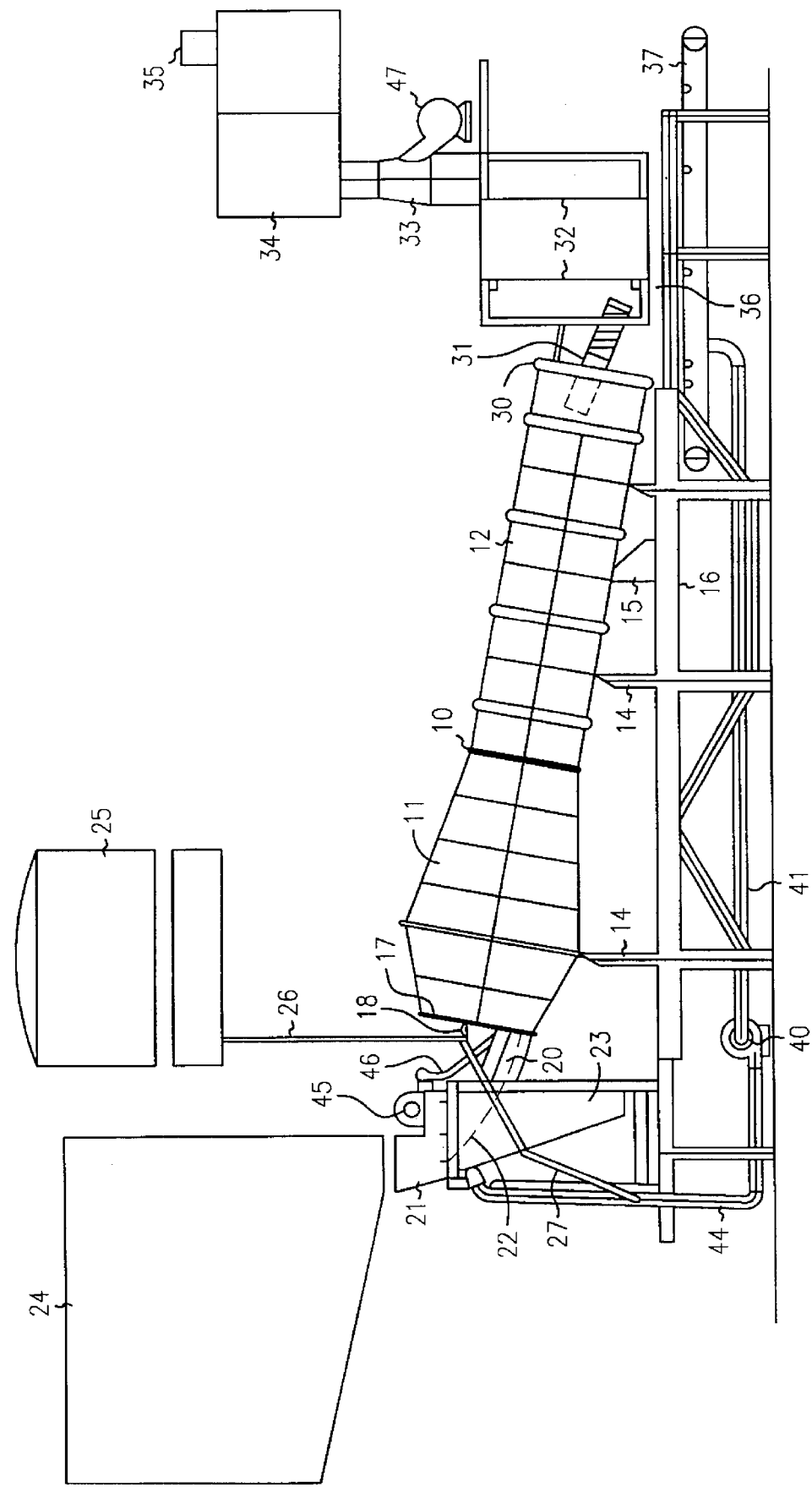
FIG. 1 illustrates kiln apparatus suitable for use in conjunction with the methods of the present invention.

As illustrated this invention includes a kiln 10, having an upper expanded portion 11, and lower a cylindrical portion 12. The kiln 10 is mounted for rotation at bearings 14, including end thrust bearing 15. The bearings transmit kiln loads to a supporting frame 16.

The upper end of the kiln 10 is provided with a closure plate 17, provided with an injection lance 18 for liquid/gas combustibles, and an inlet chute 20 for receiving pelletized waste material. The inlet chute 20 receives pellets from a pellet pre-heater 21, including a pre-heating screen 22 and a fines collection 23. The pre-heater 21 is fed from a pellet storage bin 24. The lance 18 receives liquid/gas waste and/or fuel from tank 25 by a fuel line 26 and is supplied by air line 27 with preheated air.

At the lower end of the kiln 10 is blanking plate 30, perforated by flue gas conduit 31 which conveys hot flue gas to the boiler 32. Flue gas exits the boiler 32 via a stack 33, whereby the flue gas is conveyed to a quench, scrubber and precipitator assembly 34, to be vented to the atmosphere through vent 35. Hot incinerated waste materials are ejected at 36 to pass onto the perforated metal conveyor 37.

A blower 40 draws air through the metal belt 37 and the hot waste material. Pressurized hot air from the blower 40 is conveyed via conduit 44 to the pre-heater 21 with a portion of the hot air being supplied to the burner 18 via the hot air line 27.

Volatiles expressed from the pellets on the screen 22 are fed directly to the Kiln by a blower 45 through a line 46. Additional impetus is given to the discharge of flue gasses by the provision of flue gas blower 47.

Figure 2:
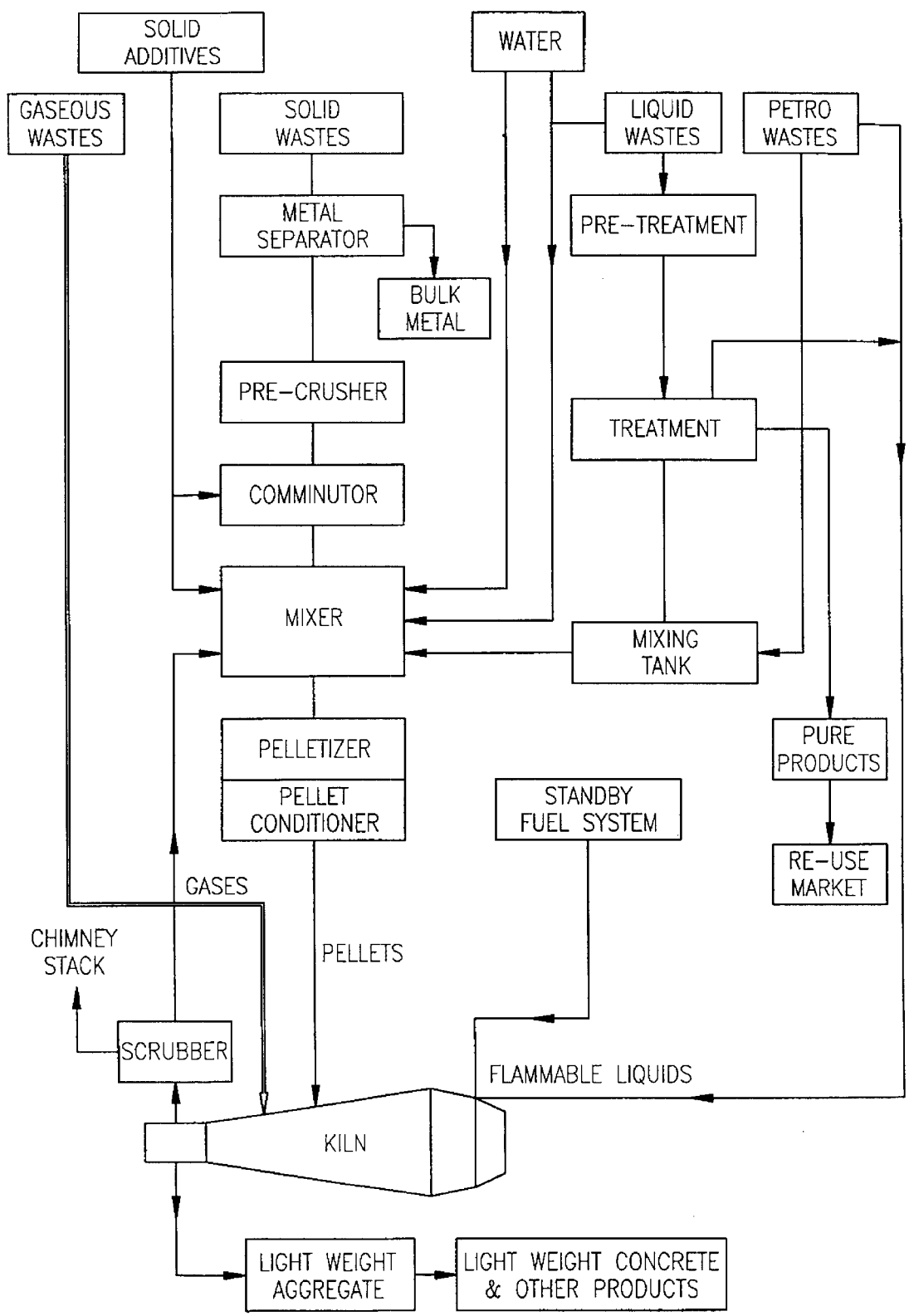
FIG. 2 is a flow chart of a waste process in accordance with the present invention.

The FIG. 2 illustrates the overall process of an embodiment of the present invention, wherein a sample of the waste is taken, analyzed and checked against a previously analyzed sample from the waste producer to ensure its authenticity. It is then unloaded and assigned to a nominated storage tank or bin.

Materials with calorific value which can be direct fired in the kiln are pumped through lances directly into the kiln where they bum and are destroyed in the high temperature gases, usually at temperatures above 1200° C. Other waste materials are pumped or conveyed to the mixer where they are blended with absorbent and earthen materials, and, if necessary, further water and other materials to produce a firm plastic type material, in this embodiment of composition in the range of 15–50% by weight waste, 5–12% absorbent (generally sawdust or cold newspaper), 0–15% other material (generally lime and old glass), and 40–60% clay.

Lime is used to control the pH of the mix usually in a slightly alkaline state as well as to give the desired ceramic characteristics of the finished pellet.

After mixing the material is extruded through a die consisting of approximately 10 mm diameter holes and the resultant extruded material cut off at about 15 mm length to form pellets. The pellets are coated with ball clay, about 10–20%, in a dusting drum to uniformly coat them and round them slightly after which they are screened to remove excess clay. They next pass through a second dusting stage where they are coated with china clay.

The coated pellets are passed to a predrier and gases from the predrier are passed through the kiln where any toxic or hazardous emissions are destroyed.

A two stage pellet coating process is used as the refractory china clay has a tendency to separate from the pellet during processing. Sticky ball clay is used to coat the pellet first to act as a binder for the china clay. With some wastes this is not necessary as the pellet has the ability to bind the china clay directly. All excess coatings, as well as spillage are recycled back to the pellet mix leaving no residues.

Once the pellets have been coated they enter the rotary kiln where they are subject to temperatures of 1200° C. or more. This causes the volatile components to boil off. The organic material is destroyed in the high temperature gases while any heavy metals or dust which escape pass out of the kiln in the exhaust gases. The speed with which the pellets pass through the kiln is controlled by the rotational speed of the kiln and this is set to allow the pellets time to properly sinter and form the ceramic inner material in which most of the heavy metals are bound. The coating stops the pellets sticking together or to the walls of the kiln.

The pellets exit the kiln after approximately 20 minutes, are cooled with combustion air and screened to remove fines. The fines are recirculated back to the pellet mixing while the good pellets go to storage awaiting final testing before being sold as inert, light weight aggregate.

Figure 3:
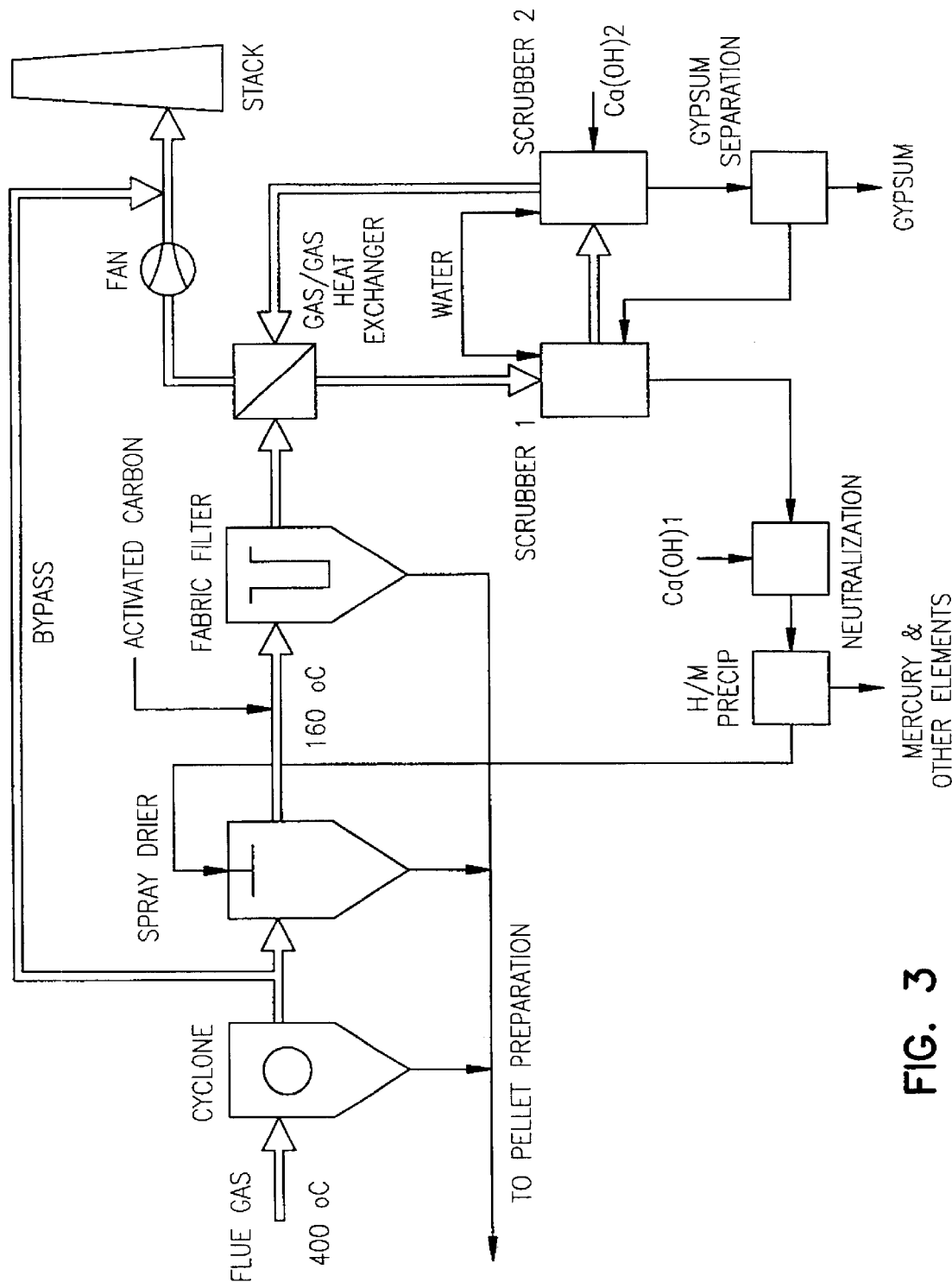
FIG. 3 is a flow chart of a flue gas scrubbing process for use in the methods of the present invention.
Figure 4:
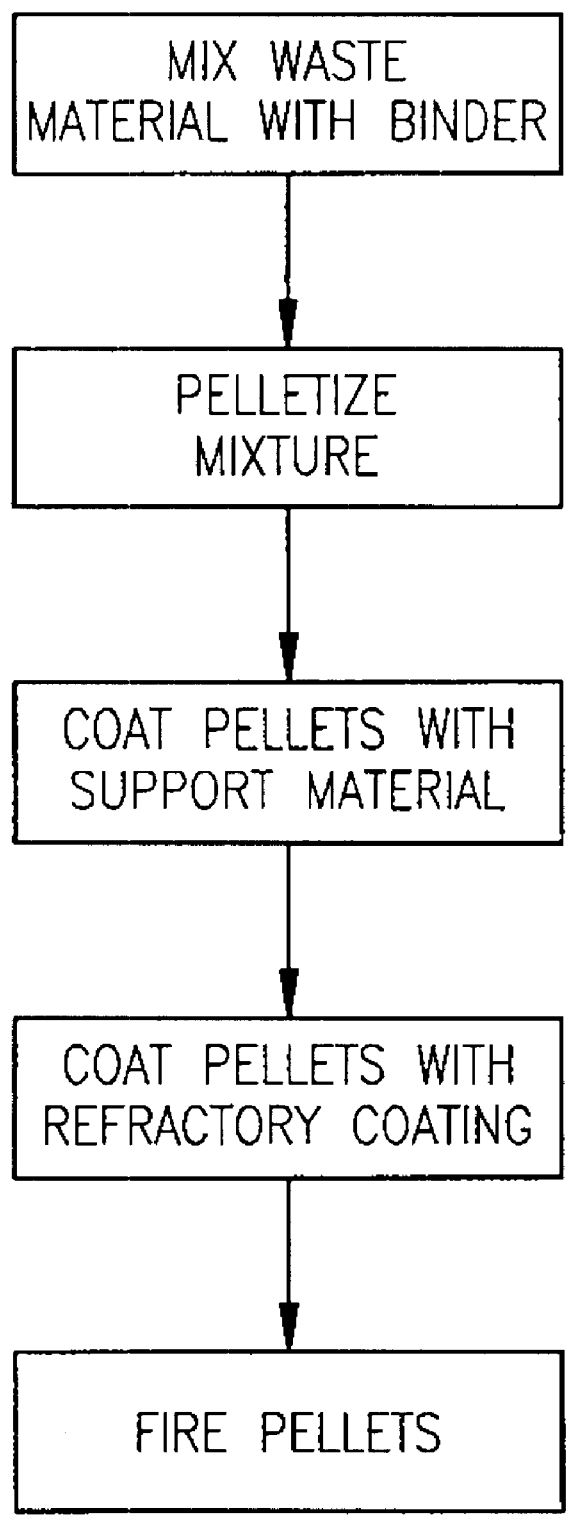
FIG. 4 is a flow chart of an embodiment of the present invention.

In this embodiment, the flue gases exhausting the kiln are directed through a waste heat boiler prior to treating in a multistage scrubbing system illustrated in FIG. 3. It should be noted that although this is the preferred system for the first commercial plant any conventional high temperature flue gas cleaning system which meets the local government requirements could be used.

In the system shown the flue gases from the waste heat boiler at about 400° C. first pass through a cyclone where the larger particles are removed. The exhaust gases are further cooled to around 160° C. in a quench tower by water and the residual from the wet scrubber. A small amount of activated carbon is added to remove some volatile heavy metals, dioxins and the like and the flue gas passed through a fabric filter to remove small particulate matter. All of the removed dust streams are recycled to the process as waste.

The gases from the filter pass through a gas heat exchanger followed by an acid and alkali wet scrubbing system. In the former chlorine and heavy metals are removed while the latter removes sulphur. The sludge from the acid scrubber is neutralized with lime and further treated to remove mercury before being returned to the quench tower. If not enough chlorine is available in the flue gas to maintain the acid conditions in the first scrubber hydrochloric acid is added. The second scrubber is maintained alkaline by the addition of lime and the sludge returned to the process as waste unless the sulphur level in the process becomes extreme in which case gypsum is removed before returning the sludge.

The cleaned gas stream is finally exhausted through the heat exchanger to the stack.

Apparatus and methods in accordance with the above embodiment confers several advantages. Firstly, incoming wastes do not have to be treated separately. They can be mixed, in general, with other wastes before treatment. This has the advantage of smoothing out variations in waste characteristics and greatly reducing the complexity of the storage areas and tank farms normally associated with toxic and hazardous waste treatment facilities. In most conventional plants mixing is not desirable as any reactions, particularly polymerization, which form pasty or solid sludges cause great handling difficulties in the further treatment.

However, the greatest advantage of the process is the ability to recycle all further waste streams generated in the facility. With conventional high temperature incineration nearly all volatile heavy metals as well as considerable quantities of heavy metal contaminated dust are extracted from the flue gas in the scrubber system. There is nowhere for these highly leachable and toxic materials to go in conventional facilities and so they are stabilised with cement and secure land filled or they are sealed in drums and buried in geologically stable formations in old mines. In many cases even the residue from the kiln is toxic and leachable and has to be similarly treated. Both methods are environmentally dubious as any destruction of the containment by mechanical or chemical attack will release the toxic materials. The resultant materials are highly leachable. As a result the sites where these materials are dumped must be maintained under constant surveillance, a huge ongoing cost and risk.

It will of course be realized that while the above has been given by way of illustrative example of this invention, all such and other modifications and variations thereto as would be apparent to persons skilled in the art are deemed to fall within the broad scope and ambit of this invention as defined in the claims appended hereto.

What is claimed is:

1. method of treatment of waste material comprising the steps of:

mixing the waste material with a firable binder;

pelletizing the mixture;

coating the pellets with a support material in the form of a contact binder coating selected from the group consisting of hydrated silicates, organic resin binders and ball clays;

subsequently coating the pellets with a refractory coating including a refractory material selected from the group consisting of high aluminium silicate content refractory clays, china clays and aluminium silicate; and firing said coated pellets in a rotary kiln.

2. A method of treatment according to claim 1, wherein the waste material is selected from the group consisting of solid waste product, liquid waste product and mixed waste product.

3. A method of treatment according to claim 2, wherein said waste material has sufficient solid content and/or solids are added such that the mixture of the waste with the binder material is of a consistency suitable for pelletizing.

4. A method of treatment according to claim 3, wherein the waste material has a combustible content and/or combustible materials are added to the mixture before firing.

5. A method of treatment of waste material, comprising:

mixing the waste material with a firable binder;

pelletizing the mixture;

coating the pellets with a contact binder coating selected from the group consisting of hydrated silicates, organic resin binders and ball clays;

coating the pellets with a refractory coating selected from the group consisting of high aluminium silicate content refractory clays, china clays and aluminium silicate;

firing the coated pellets in a rotary kiln; and wherein the pH of the pelletized mixture is alkaline.

6. A method of treatment according to claim 5, wherein the waste comprises a mixture of galvanic sludge and toxic liquid waste formulated to a pelletizable material of composition, by weight, of:

| | |
|---|---|
| 15–50% | waste; |
| 5–12% | of an absorbent selected from sawdust and newspaper; |
| 40–60% | clay; |
| 0–15% | alkalinizer selected from one or a mixture of lime, glass, and fluxing agents; and |
| 0–15% | water. |

7. A method of treatment according to claim 6, wherein the waste is formulated to a pelletizable material of composition, by weight, of:

| | |
|---|---|
| waste | 46% |
| sawdust | 9% |
| clay | 1% |
| Ca(OH)$_2$/BaCO$_3$ | 4%. |

8. A method of treatment, comprising:
mixing the waste material with a firable binder;
pelletizing the mixture;
coating the pellets with a contact binder coating selected from the group consisting of hydrated silicates, organic resin binders and ball clays;
coating the pellets with a refractory coating selected from the group consisting of high aluminium silicate content refractory clays, china clays and aluminium silicate;
tumbling or rolling the coated pellets to produce a smooth surface thereon; and
firing the coated pellets in a rotary kiln.

9. A method of treatment of waste material, comprising:
mixing the waste material with a firable binder;
pelletizing the mixture;
coating the pellets with a contact binder coating selected from hydrated silicates, organic resin binders and ball clays;
coating the pellets with a refractory coating selected from high aluminium silicate content refractory clays, china clays and aluminium silicate;
firing said coated pellets in a rotary kiln at a temperature of at least 1200° C.;
cooling flue gases from said kiln to recover heat values;
removing particulates from said cooled flue gas;
sequentially wet acid and alkali scrubbing said cooled flue gas; and
returning scrubber sludges to said mixing step.

10. A method of treatment according to claim 9, wherein flue gases are cooled by a gas to air heat exchanger and wherein heated air is passed into the kiln.

11. A method of treatment according to claim 9, wherein flue gases are cooled by recovery of heat into a boiler, followed by quenching.

12. A method of treatment according to claim 9, wherein sludge from said acid scrubbing step is neutralised and further treated to remove condensible metals therefrom, the treated sludge being returned the mixing process or to a quench process.

13. A method of treatment according to claim 9, wherein said alkali scrubbing step is maintained in the alkaline range by addition of a mineral alkali selected from the group consisting of alkali metal hydroxide, alkaline earth metal hydroxides and mixtures thereof.

14. A method of treatment according to claim 13, wherein alkali scrubber is treated to remove accumulative sulphuric acid salts as gypsum before returning the scrubber sludge to the mixing step.

15. A waste processing apparatus for use in the method as claimed in claim 9, comprising:
a rotary kiln adapted to fire the coated pellets without agglomeration at a temperature of at least 1200° C.;
heat exchange means adapted to cool flue gases from said kiln with recovery of heat values;
particulate removing means for said flue gas; and
sequential wet acid and alkali flue gas scrubbing means.

16. A method of treatment of waste material according to claim 2, wherein is the waste product is selected from the group consisting of sewage sludges, oil sludges, common garbage and liquid toxic metal wastes.

17. The method of claim 5, wherein coating the pellets with the refractory coating occurs after coating the pellets with the contact binder coating.

18. The method of claim 8, wherein coating the pellets with the refractory coating occurs after coating the pellets with the contact binder coating.

19. The method of claim 9, wherein coating the pellets with the refractory coating occurs after coating the pellets with the contact binder coating.

20. A method of treatment of waste material, comprising:
mixing the waste material with a firable binder;
pelletizing the mixture to form pellets;
thereafter coating the pellets with a support material in the form of a contact binder coating selected from the group consisting of hydrated silicates, organic resin binders and ball clays;
subsequently coating the contact binder coating on the pellets with a refractory coating including a refractory material selected from the group consisting of high aluminium silicate content refractory clays, china clays and aluminium silicate; and
firing said coated pellets in a rotary kiln.

* * * * *